(No Model.)

W. J. COCHRAN.
HORSE COLLAR PAD.

No. 275,886. Patented Apr. 17, 1883.

WITNESSES:
Theo. G. Hoster
C. Sedgwick

INVENTOR:
W. J. Cochran
BY Munn & Co
ATTORNEYS.

UNITED STATES PATENT OFFICE.

WILLIAM J. COCHRAN, OF DENISON, IOWA, ASSIGNOR TO HIMSELF AND G. W. APPLE AND H. G. PETERS, OF SAME PLACE.

HORSE-COLLAR PAD.

SPECIFICATION forming part of Letters Patent No. 275,886, dated April 17, 1883.

Application filed October 16, 1882. (No model.)

*To all whom it may concern:*

Be it known that I, W. J. COCHRAN, of Denison, Crawford county, Iowa, have invented an Improvement in Horse-Collar Pads, of which the following is a specification.

The object of the invention is to prevent galls on the necks of horses, and to allow any already formed to heal up while the animal is doing his ordinary work.

Figure 1:
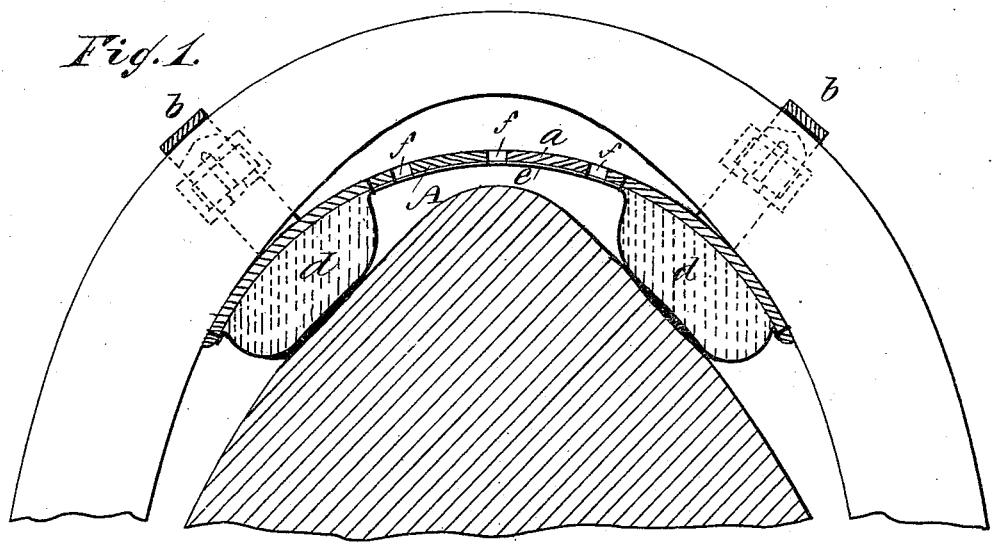
Figure 2:
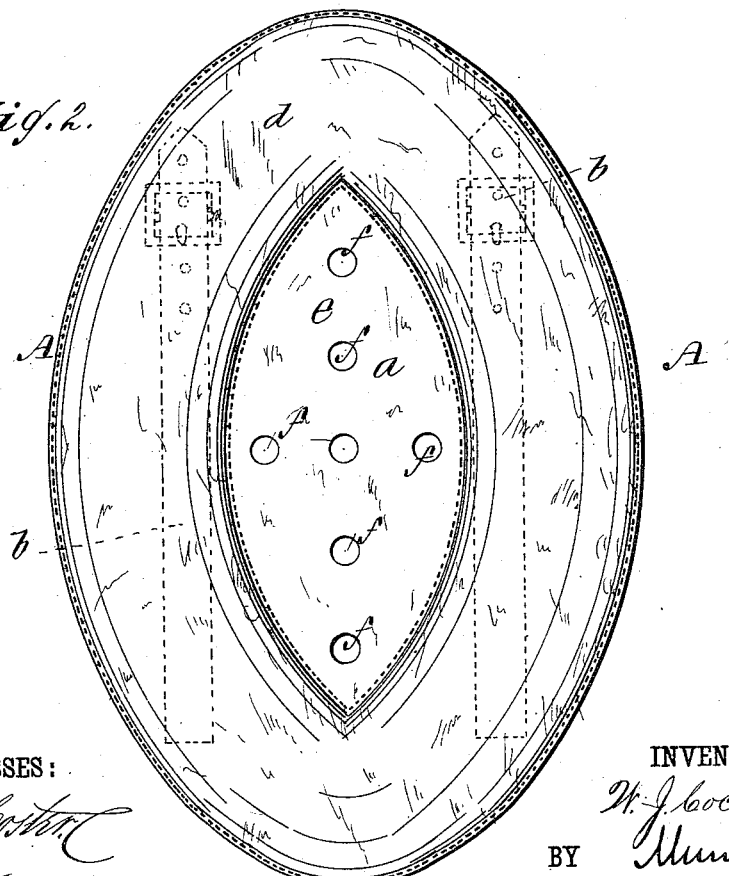

Figure 1 of the drawings is a sectional elevation, showing the position occupied by the pad upon the horse's neck and the set of the collar thereon. Fig. 2 is a plan view, showing the position of the flexible back on the pad.

In the drawings, A represents the pad, which is made of oval or oblong form on the outside and inside, so as to produce a median opening, $e$, surrounded by the padding material $d$. $a$ represents a back, which extends not only over the padding $d$, but also over the opening $e$, is made of flexible material, and has holes $f$ over the opening, so as to admit air. $b$ are straps by which the back $e$ is secured to the collar in the usual way.

I am aware that two pads have been employed, being connected by a flexible strap or by a rigid tree; but my pad surrounds the galled place with a wall of padding on all sides, and is not liable to displacement, while the inlet of air through the holes $f$ allows the sore to be kept cool, and the continuity of the pad, together with the back, excludes flies.

What I claim as new and of my invention is—

A horse-collar pad formed of a continuous padding, $d$, oval in form, and having the middle-perforated back, $a$, substantially as described.

WILLIAM J. COCHRAN.

Witnesses:
A. J. BOND,
M. E. JONES.